(12) United States Patent
Lee et al.

(10) Patent No.: US 6,261,075 B1
(45) Date of Patent: Jul. 17, 2001

(54) HOT RUNNER SYSTEM FOR COINJECTION MOLDING

(75) Inventors: Christopher W. Lee, Burlington; Mark D. Moss, Boxford, both of MA (US)

(73) Assignee: Synventive Molding Solutions, Inc., Gloucester, MA (US)

( * ) Notice: Subject to any disclaimer, the term of this patent is extended or adjusted under 35 U.S.C. 154(b) by 0 days.

(21) Appl. No.: 09/518,982

(22) Filed: Mar. 3, 2000

Related U.S. Application Data

(63) Continuation of application No. 08/922,208, filed on Sep. 2, 1997, now Pat. No. 6,062,840.

(51) Int. Cl.[7] .......................... B29C 45/22; B29C 45/23
(52) U.S. Cl. ................................ 425/130; 425/564
(58) Field of Search .................... 425/130, 549, 425/564; 264/255

(56) References Cited

U.S. PATENT DOCUMENTS

| | | |
|---|---|---|
| 4,497,621 | 2/1985 | Kudert et al. . |
| 4,512,730 | 4/1985 | Kudert et al. . |
| 4,518,344 | 5/1985 | Latreille et al. . |
| 4,712,990 | 12/1987 | Kudert et al. . |
| 4,717,324 | 1/1988 | Schad et al. . |
| 4,775,308 | 10/1988 | Schad et al. . |
| 4,808,101 | 2/1989 | Schad et al. . |
| 4,863,369 | 9/1989 | Schad et al. . |
| 4,892,699 | 1/1990 | Kudert et al. . |
| 4,895,504 | 1/1990 | Kudert et al. . |
| 4,925,100 | 5/1990 | Kudert et al. . |
| 4,931,234 | 6/1990 | Schad et al. . |
| 4,931,246 | 6/1990 | Kudert et al. . |
| 4,932,858 | 6/1990 | Gellert . |
| 4,934,915 | 6/1990 | Kudert et al. . |
| 4,946,365 | 8/1990 | Kudert et al. . |
| 5,028,226 | 7/1991 | De'ath et al. . |
| 5,037,285 | 8/1991 | Kudert et al. . |
| 5,106,284 | 4/1992 | Kobayashi et al. . |
| 5,223,275 | 6/1993 | Gellert . |
| 5,286,184 | 2/1994 | Nakayama . |
| 5,374,178 | 12/1994 | Nakayama . |
| 5,523,045 | 6/1996 | Kudert et al. . |
| 5,545,028 | * 8/1996 | Hume et al. .................. 425/549 |
| 5,914,138 | 6/1999 | Swenson . |

FOREIGN PATENT DOCUMENTS

3632928 A1  3/1988  (DE) .
0 378 138 A2  7/1990  (EP) .

OTHER PUBLICATIONS

Injection Molding Magazine, Nov. 1996, "Coinjection hot runner basics".

* cited by examiner

Primary Examiner—Tim Heitbrink
(74) Attorney, Agent, or Firm—Wolf, Greenfield & Sacks, P.C.

(57) ABSTRACT

A coinjection molding system for injecting skin and core material into a mold cavity. The system includes a three position actuator for moving a valve pin into a closed position in which neither skin nor core flow is permitted, a middle position in which only skin flow is permitted, and an open position in which skin and core flow is permitted. The actuator includes a first piston slidably mounted in an actuator housing, and a second piston, attached to the valve pin, slidably mounted within the first piston. A shut-off is provided in the manifold for preventing skin flow to a particular nozzle during sequential gating.

11 Claims, 13 Drawing Sheets

Fig. 20

HOT RUNNER SYSTEM FOR COINJECTION MOLDING

This application is a continuation of application Ser. No. 08/922,208, filed Sep. 2, 1997, entitled HOT RUNNER SYSTEM FOR COINJECTION MOLDING, and now U.S. Pat. No. 6,062,840.

FIELD OF THE INVENTION

This invention relates to coinjection molding.

DESCRIPTION OF THE RELATED ART

Coinjection molding is the injection molding of two or more plastic materials in which an outer skin layer is formed surrounding one or more core layers. In coinjection molding the first material to enter the cavity is the skin material. Upon entering the cavity, the skin material will develop a flow front through the cavity towards the end wall of the cavity. The material flowing in the center of the cavity wall has the highest velocity. As the center flow reaches the flow front, it splits to the outer wall. The skin material contacts the cold mold wall and freezes developing a frozen layer. This frozen layer is the skin layer.

Before the skin material reaches the end of the cavity, the core material will be injected into the part to form the core of the part. The core material will develop a second flow front. The flow front will have a different velocity profile than the skin material. The core material pushes the skin material ahead of it, however, the center velocity of the core material will travel faster than the skin flow front. If the correct skin/core ratio is used, the skin material will reach the end of the cavity just ahead of the core.

An advantage of coinjection molding is the use of a core material having a different material than the skin material which appears visible on the molded part. Coinjection enables the use of less expensive materials as the core material, and can lower part costs substantially.

For example, in large automotive parts, especially a bumper fascia made of thermoplastic olefin (TPO), the molded parts are painted. The painted parts are often rejected for imperfections. The rejected parts do not have recycle value due to the paint in the reprocessed material, and are typically disposed of in landfills. With coinjection molding, it is possible to use the reprocessed reground painted fascia as the core of the part. New or virgin TPO is used as the skin layer. Thus, the coinjected molded part appears the same as a conventional part, while using a substantial amount of recycled material that otherwise would have been new TPO.

Other coinjection applications include fabrication of parts which require different properties of the skin and core materials, respectively. For example, expensive engineering resins may be needed on the outer surface of the part for special properties such as high strength, good heat deflection, or good weather resistance. Inexpensive core material can be used to reduce the part costs while maintaining the desired performance properties of the engineering resin. An example of this would be the use of Ultem as the skin material and polyethylene terephthalate (PET) as the core material.

Additionally, it may be desired to have a core material that has specific properties. An example is coinjection with a foamed core. A foamed core material with an unfoamed skin can be used to produce parts with a good appearance and with the benefits of light weight, large wall thickness, and good strength. Another example is using coinjection to produce PET food containers with ethylene vinyl alcohol (EVOH) in the core. EVOH prevents oxygen from discoloring the food. Lastly, molded in paint can be used to eliminate painting applications. With coinjection, a painted skin can be produced with an unpainted core to maintain low part costs.

Accordingly, it is an object of the present invention to provide an improved coinjection system.

It is a further object of the invention to provide an improved multiple gate coinjection system.

It is a further object of the invention to provide an improved valve pin actuator for a coinjection nozzle.

It is a further object of the present invention to provide an improved coinjection manifold system in which the manifold includes a skin shut-off.

SUMMARY OF THE INVENTION

In one illustrative embodiment of the invention, a valve pin actuator for a coinjection molding system is provided in which the valve pin actuator supports a valve pin adapted to control skin plastic flow and core plastic flow at a gate to a mold cavity. The valve pin actuator includes an actuator body, a first member movably mounted within said actuator body, and a second member movably mounted within said actuator body. The second member is adapted to support said valve pin such that movement of said second member causes movement of said valve pin, in which the first and second members are each movable to a plurality of positions to control movement of the valve pin to reciprocate to three separate positions. The three positions include a first position in which the valve pin closes the gate and neither skin nor core plastic flow is permitted; a second position remote from the gate relative to the first position, in which skin flow is permitted and core flow is not permitted through the gate; and a third position remote from the gate relative to the second position, in which skin flow and core flow is permitted through the gate.

In another illustrative embodiment of the invention, a coinjection molding system is provided for injecting first and second plastic materials into a mold cavity. The system includes a manifold having first and second channels therethrough for distributing said first and second plastic materials, and at least one nozzle coupled to the manifold for injecting said first and second plastic materials from said manifold into said mold cavity. The nozzle has first and second passages for receiving first and second plastic materials from the first and second channels of said manifold, respectively. The system also includes a shut-off in the first channel of said manifold for preventing a flow of said first material in said first channel.

DETAILED DESCRIPTION

FIGS. 1–5 show one embodiment of the coinjection molding system 1 according to the present invention. The system includes bores 3 and 5 within inlets 44 and 46 mounted to a hot runner manifold 11 (see FIG. 5). Inlets 44 and 46 receive the injection molding nozzles 7 and 9, respectively, from two injection molding machines. Machine nozzle 7 injects core material into inlet 44 while machine nozzle 9 injects skin material into inlet 46. The bores 3 and 5 feed into a distribution system of the hot runner manifold 11. The hot runner manifold 11 includes distribution channels 13 and 15 for feeding core and skin material, respectively, to injection molding nozzles 17. Although, a multiple gate, single cavity, system is shown, the invention is not limited to multiple gate applications. For example, the injection molding machine could be directly coupled to a single nozzle, or spue bushing, 17. Nozzle 17 includes bores 19 and 21 therethrough for communicating with and receiving molten material from core channel 13 and skin channel 15 in the manifold 11.

Figures 6, 7:
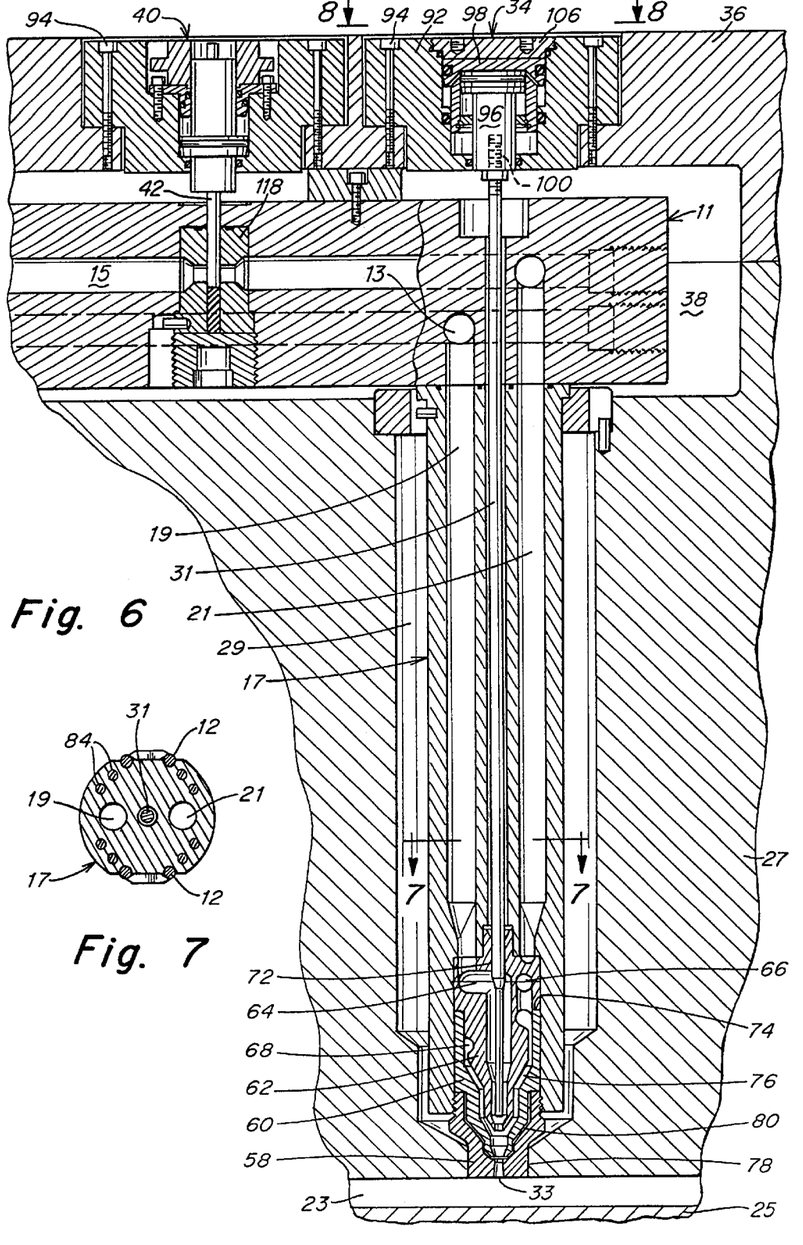
FIG. 6 is an enlarged fragmentary cross-sectional view taken along line 6—6 of FIG. 1.
FIG. 7 is a plan cross-sectional view of the nozzle taken along line 7—7 of FIG. 6.
Figure 8:
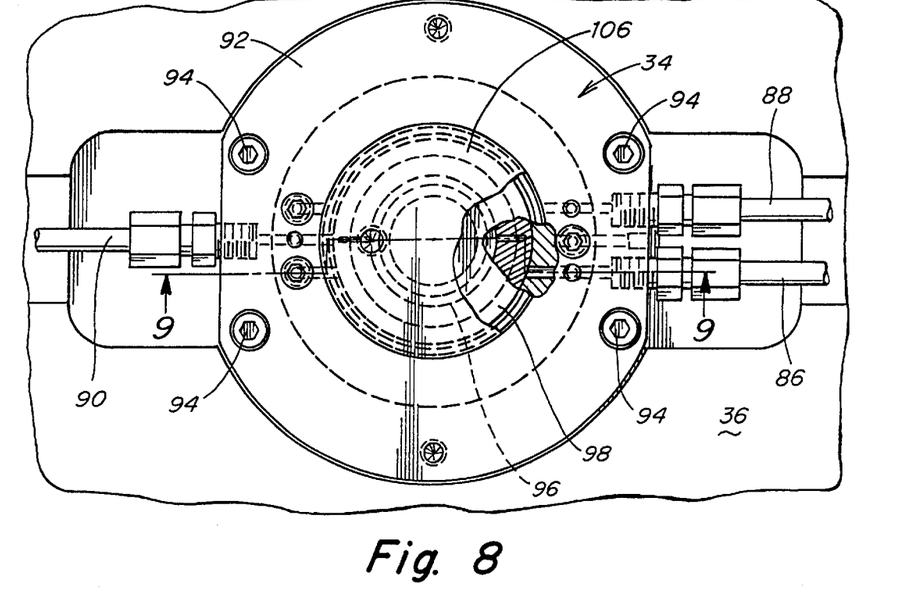
FIG. 8 is a top plan view of the three position actuator seated in a cavity in the top clamp plate as taken along lines 8—8 of FIG. 6.
Figure 9:
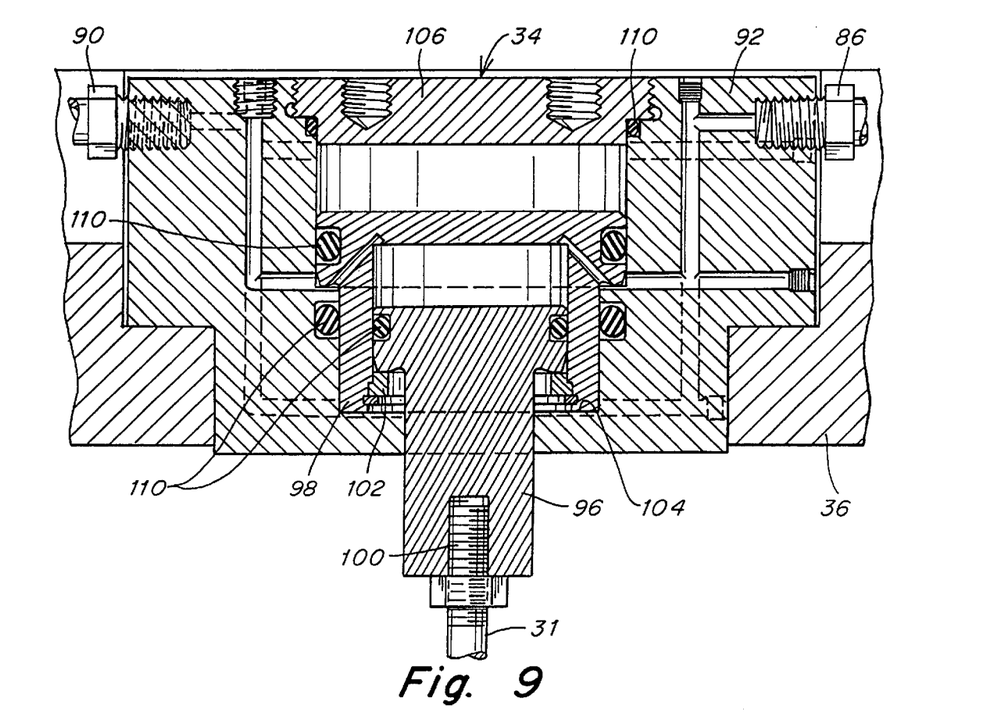
FIG. 9 is a cross-sectional side view of the actuator of FIG. 8 taken along line 9—9 of FIG. 8.

The injection molding nozzle 17 injects molten material into mold cavity 23 in which the molded part is formed. As seen in FIG. 7, heat pipes 84 are used to uniformly distribute heat, generated by tubular heater 12 and manifold 11, to nozzle 17, and keep the skin and core materials at their optimum processing temperature. The tubular heater 12 is partially shown in the fragmentary view of FIG. 2, and in FIG. 7, and is mounted to and extends along the length of the nozzle 17. The invention is not limited, however, to a particular type of nozzle heater, and other nozzle heaters such as helical heaters can be used.

The mold cavity 23 is formed by mold parts 25 and 27. Nozzles 17 are disposed within recesses 29 of mold part 27.

A valve pin 31 is located in a central bore in the injection molding nozzle 17. The valve pin 31 can be longitudinally displaced within the nozzle 17 and opens and closes the gate 33 to the mold, as well as the bore 19 through which the core material flows. As explained in greater detail hereinafter, the valve pin 31 will have three possible positions: 1) a closed position in which the gate 33 is closed and skin and core material are shut-off; 2) a middle position in which core material is shut-off and skin material is not shut-off; and 3) an open position where both skin and core material are not shut-off.

The valve pin 31 can be longitudinally displaced within the nozzle 17 by a three-position actuator 34. The actuator 34 is mounted in top clamp plate 36 which together with mold part 27 provides a space 38 in which the manifold 11 is located.

An additional two-position actuator 40 is provided to shut-off skin material traveling in channel 15 of the manifold 11. The actuator 40 is also located in top clamp plate 36 and actuates the valve pin 42 that opens and closes channel 15 of manifold 11.

Figure 1:
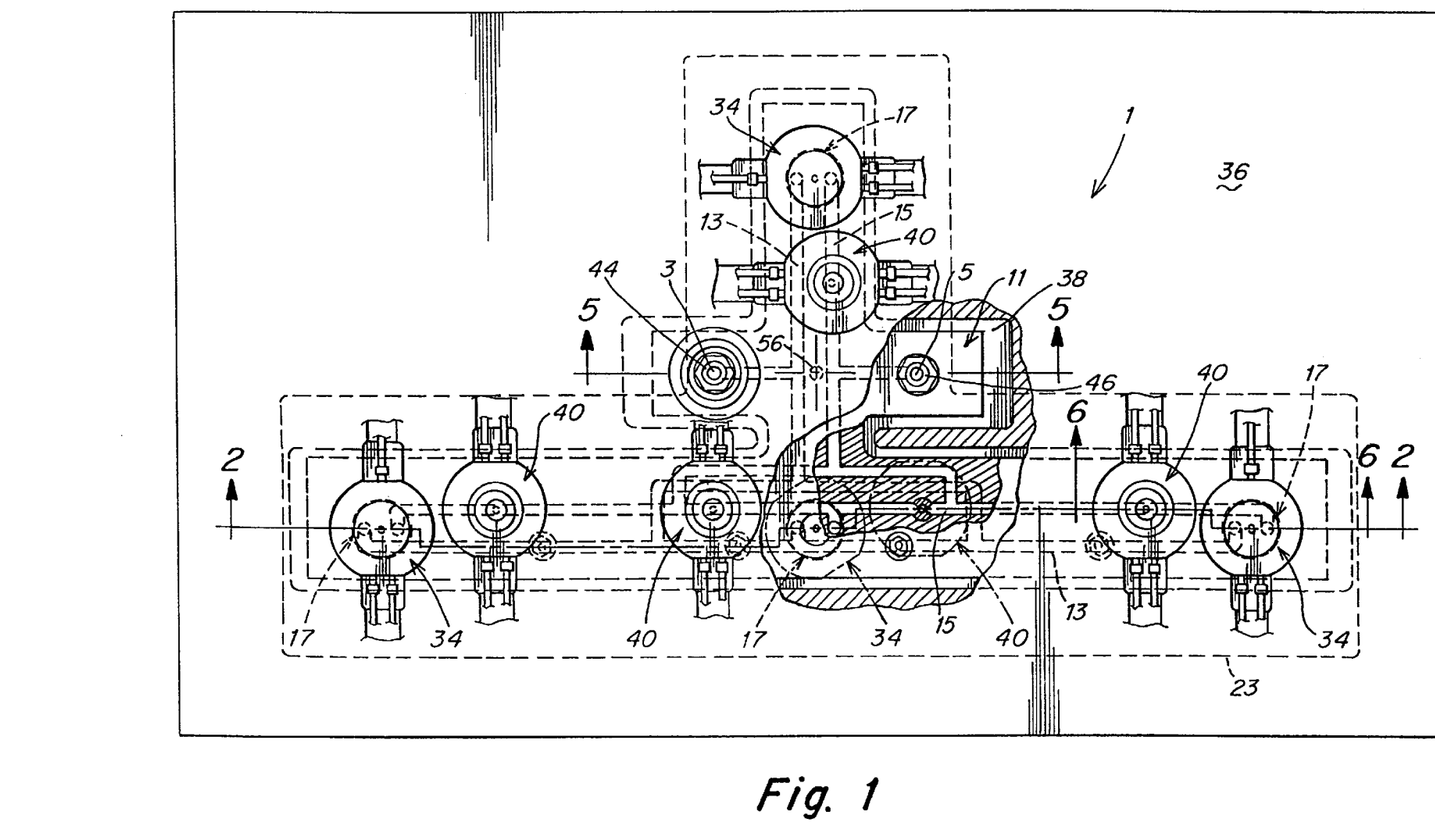
FIG. 1 is a top plan view of the coinjection molding system partially broken away.
Figure 2:
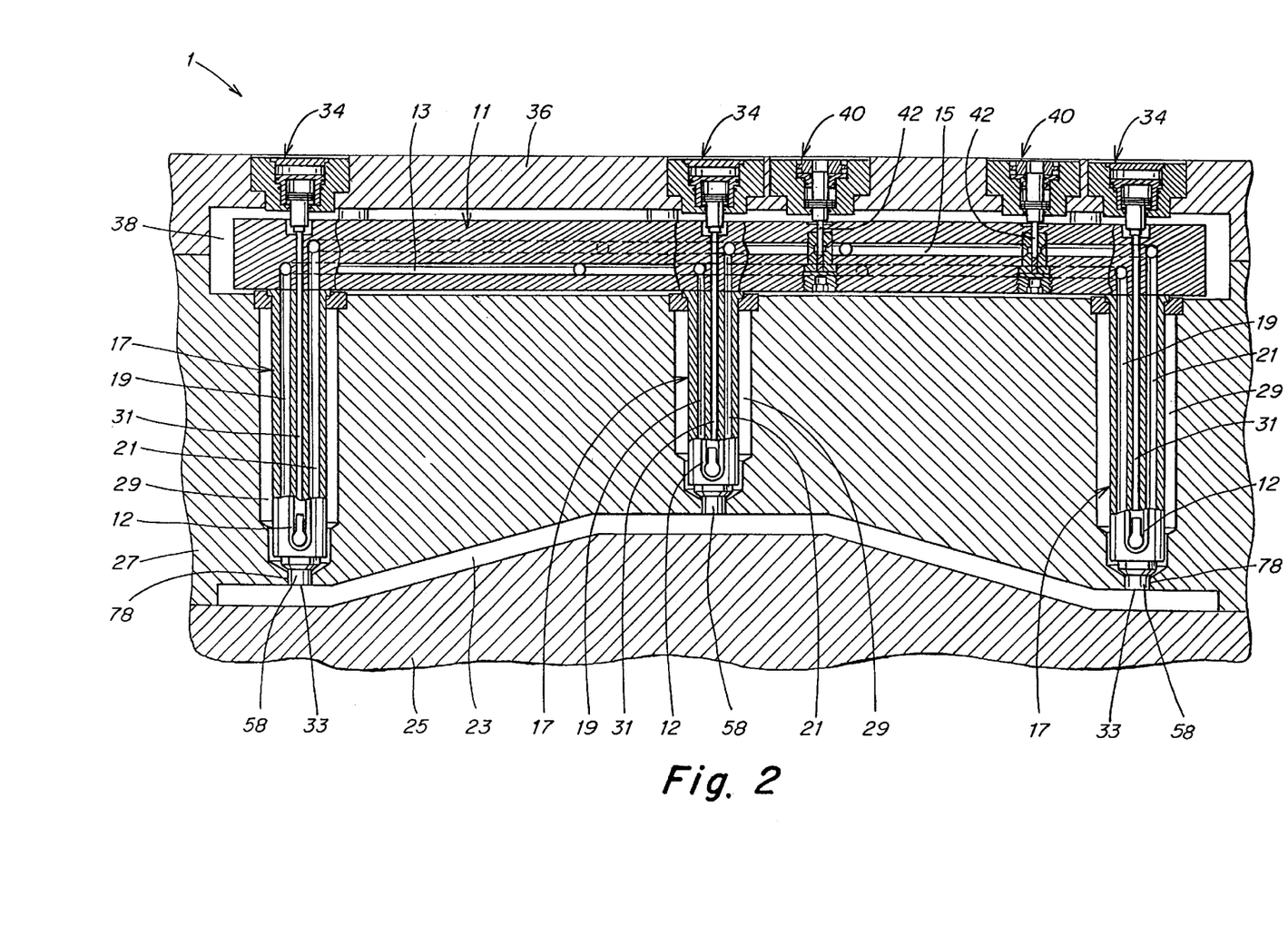
FIG. 2 is a cross-sectional side view of the coinjection molding system taken along line 2—2 of FIG. 1.
Figure 3:
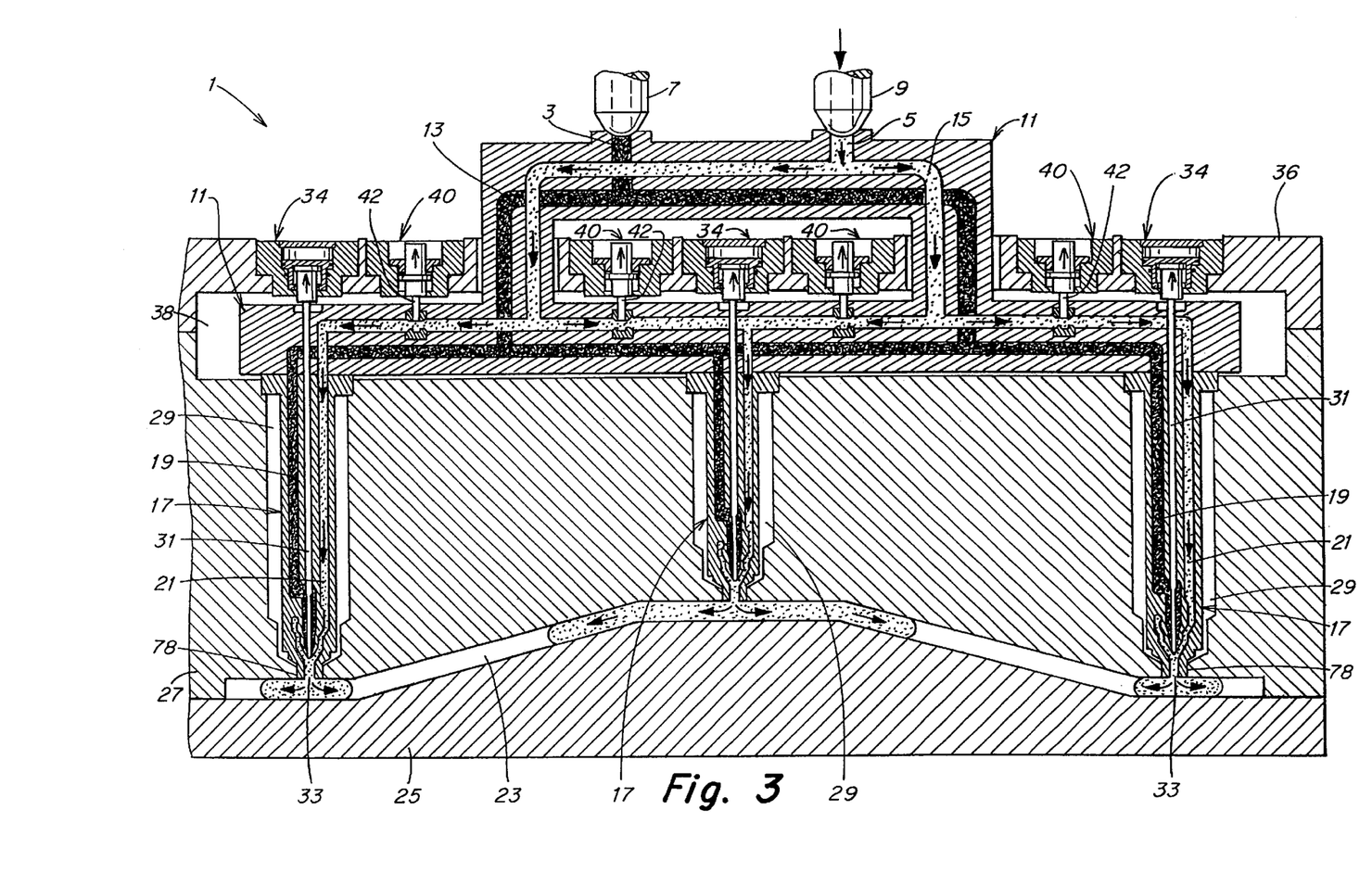
FIG. 3 is a schematic cross-sectional view similar to FIG. 2 showing the injection of skin material into the mold cavity.
Figure 4:
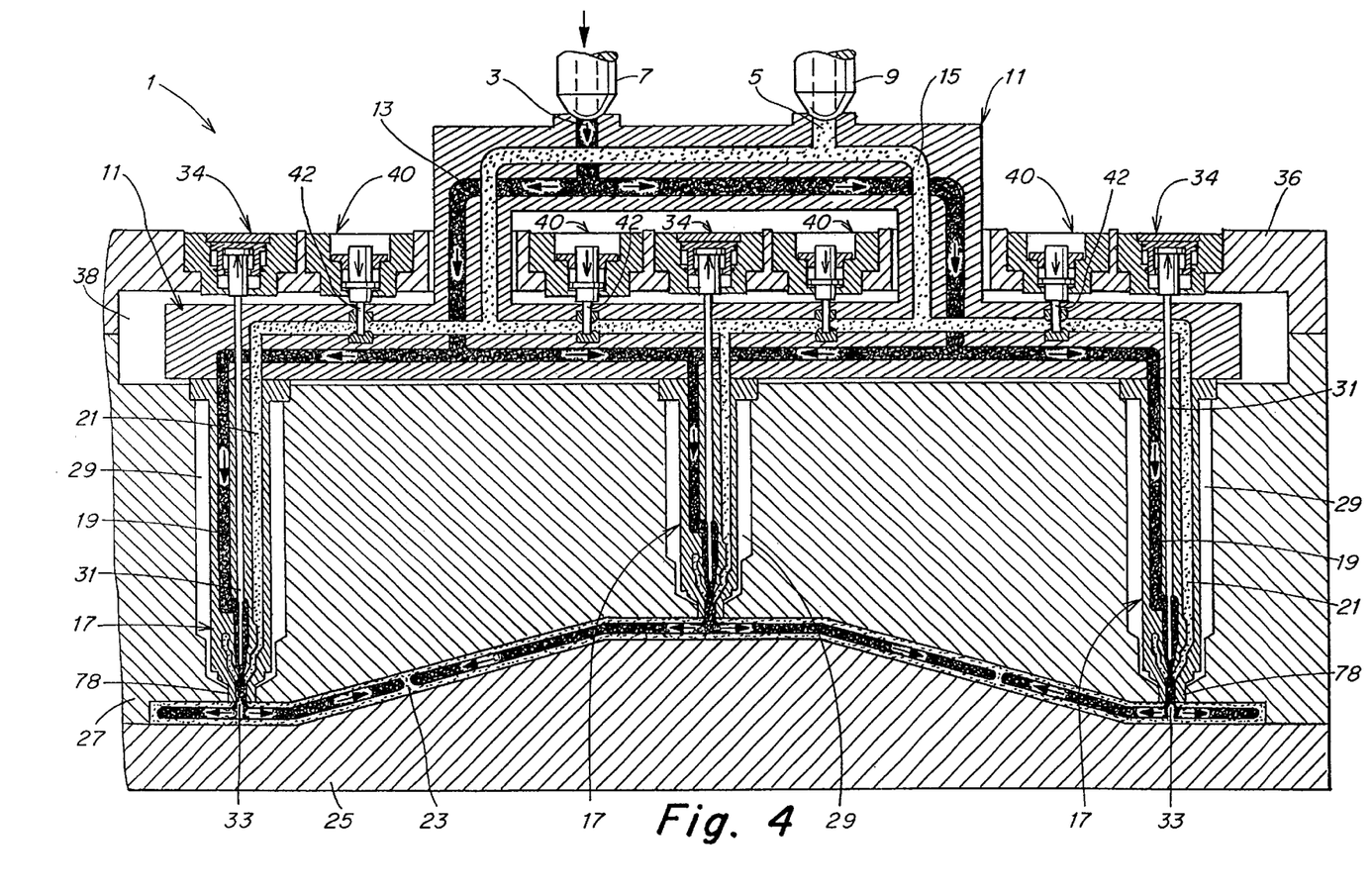
FIG. 4 is a schematic cross-sectional view similar to FIG. 3 showing the injection of core material into the mold cavity.
Figure 5:
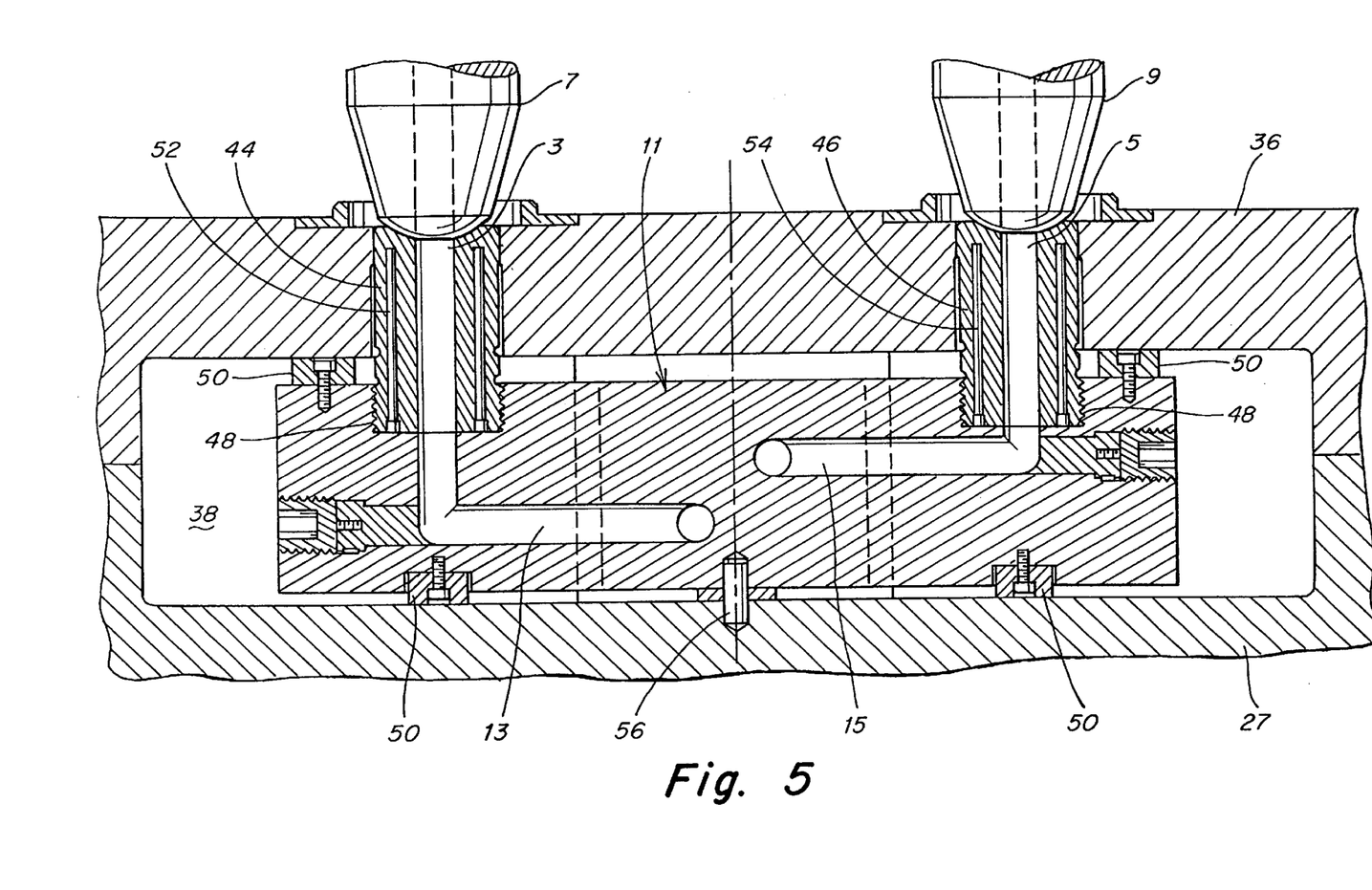
FIG. 5 is a fragmentary cross-sectional side-view of the injection nozzle of the injection molding machine and the hot-runner manifold taken along line 5—5 of FIG. 1.

It should be noted that FIGS. 3 and 4 represent schematic views of the manifold 11 and top clamp plate 36 so as to better show the flow of skin and core material through the manifold channels 13 and 15. In actuality, as shown in FIG. 5, the manifold is completely covered by the top clamp plate 36, and the machine nozzles 7 and 9 inject core and skin material respectively into bores 3 and 5 within inlets 44 and 46, respectively.

Inlets 44 and 46 mate with machine nozzles 7 and 9, respectively, are threadably mounted in manifold 11 at 48, and set within top clamp plate 36. Spacers 50 separate and insulate the heated manifold from the cooled mold 27. Heat pipes 52 and 54 within inlets 44 and 46 serve to maintain the molten material at its processing temperature when passing through inlets 44 and 46 by pulling heat out of the manifold. Pin 56 serves to center the manifold 11 with respect to the mold 27. Thus, in schematic FIGS. 3 and 4, in actuality the manifold does not extend above the top clamp plate, but is covered by it, and further the machine nozzles 7 and 9 are not directly connected to the manifold 11 but are connected via inlets 44 and 46 which pass through the top clamp plate 36.

Figure 13:
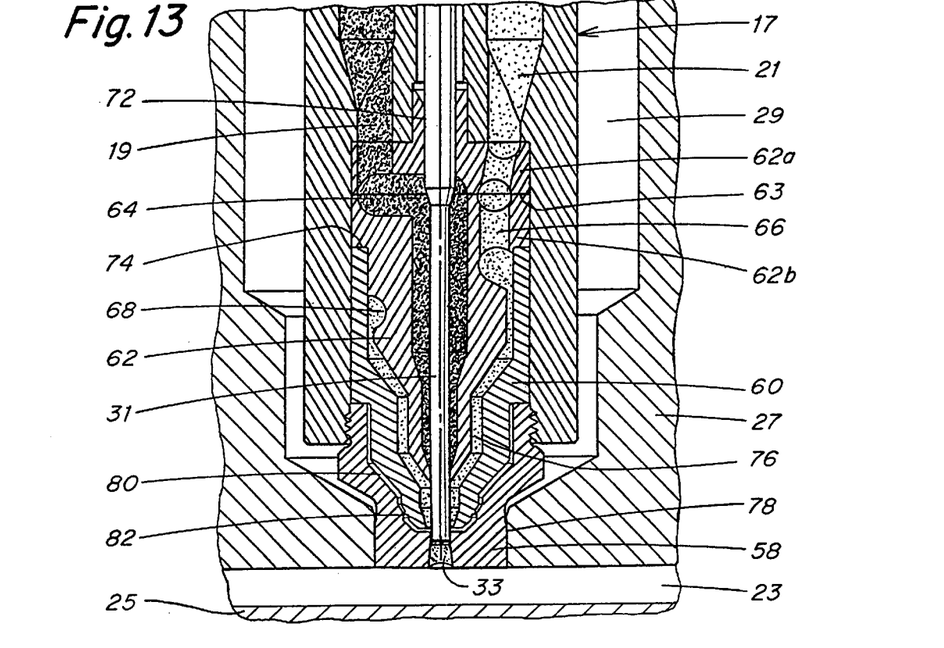
FIG. 13 is a schematic cross-sectional view of the nozzle tip of FIG. 6 in the closed position.
Figure 14:
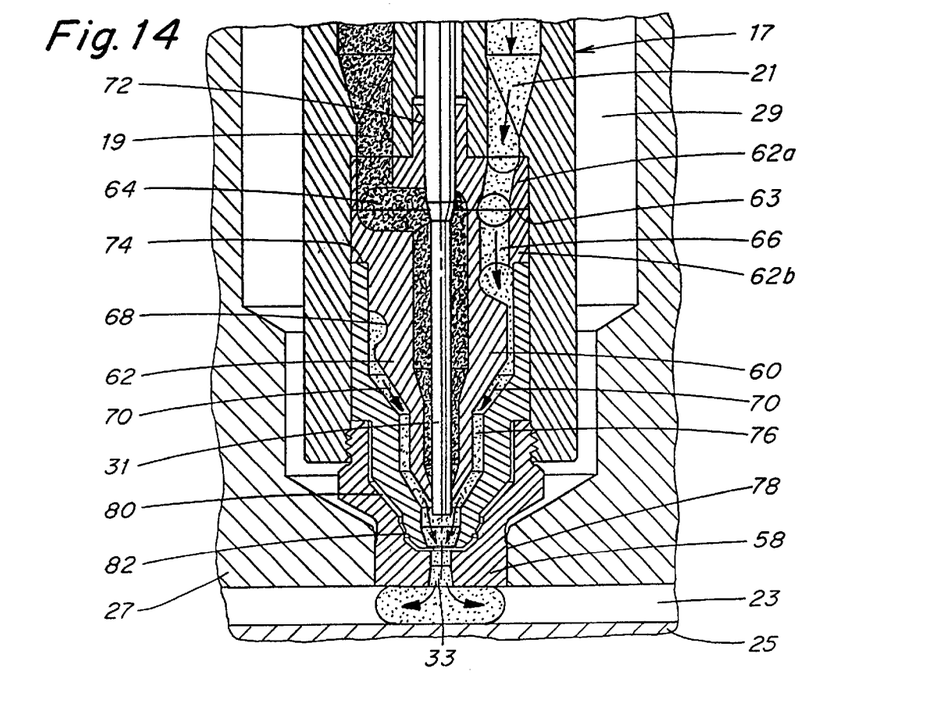
FIG. 14 is similar to FIG. 13 with the valve pin in the middle position permitting skin injection.
Figure 15:
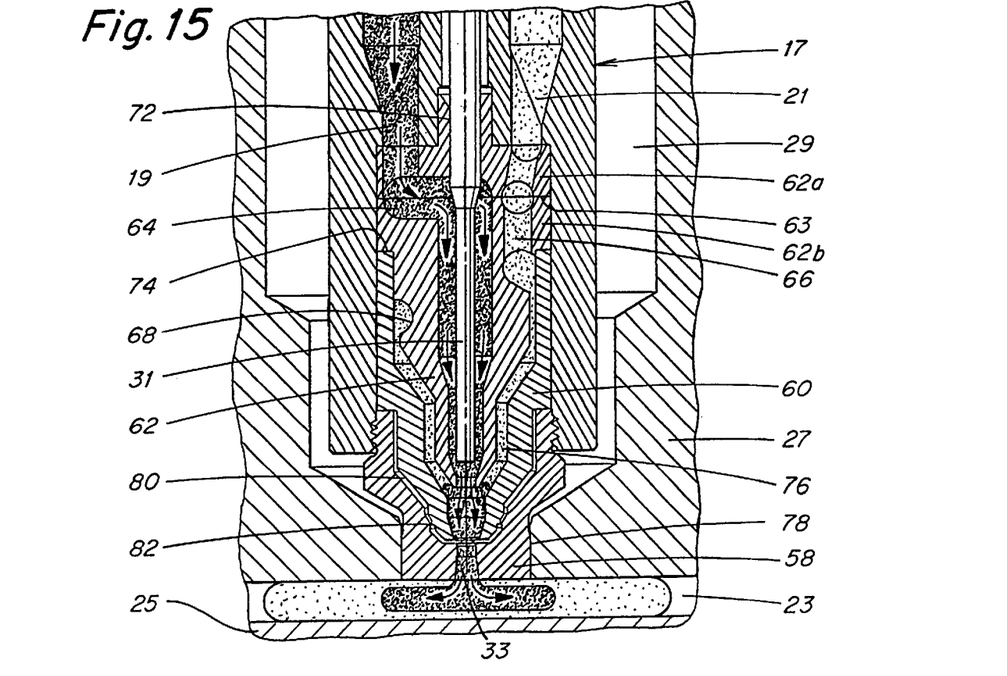
FIG. 15 is similar to FIG. 13 with the valve pin in the open position.

The operation of the preferred embodiment of the preferred system of FIGS. 1–5 will now be described with respect to FIGS. 3, 4, 13, 14 and 15. To initiate the coinjection sequence, skin material is injected from the machine nozzle 9 through manifold channel 15 to nozzle 17 out of gate 33 into cavity 23. FIG. 13 shows the nozzle in the closed position with core and skin material ready to be injected into the cavity 23. In FIG. 14, the valve pin has moved from the closed position to a second or middle position in which skin flow from bore 21 of the nozzle 17 into the cavity 23 begins, and core flow from bore 19 of the nozzle is still shut off. Thereafter, as shown in FIG. 15, the valve pin moves to the open or third position in which core material is injected from bore 19 of nozzle 17 out of gate 33. When the core shut-off is open, the skin barrel from the injection molding machine is either slowed down to about 10% or held. Injection of a small amount of skin material while the core material is being injected helps maintain the layer of skin material about the gate.

Injection of core material from the injection molding machine is then stopped. The valve pin is moved back to the middle position shutting off the core, while the final 5% to 10% of skin material is injected to assure that skin material covers the gate area, and also cleans out the gate area in the nozzle 17 of all core material so that on the next injection cycle only skin material initially enters the part. Typically, core material will constitute about 25–50% of the molded part, but this percentage will vary according to the application.

The use of a valve-actuated gate enables the gates to be sequentially opened and closed. In a multiple gate single cavity system, such as the one shown in the embodiment of FIGS. 1–4, sequential gating enables the location of weld lines, that is, the location in the cavity where the molten material from one gate meets the molten material from a different gate, to be moved. A weld line can result in a visible imperfection in the part, and can be structurally weaker than the rest of the molded part. Sequential gating enables weld lines to be eliminated, or moved to areas of the part where mechanical stresses are relatively low.

To facilitate the flow of the core and skin material from nozzle bores 19 and 21 to the gate 33, the nozzle includes tip 58, sleeve 60 and insert 62, best shown in FIGS. 6 and 13–16. Insert 62 includes bores 64 and 66 for communicating with bores 19 and 21 and receiving the core material and skin material from the nozzle 17. Bore 64 also accommodates the valve pin 31 as the core material travels through the center of the insert 62 in about the valve pin 31. Due to the difficulty of machining irregularly shaped bore 64 through the insert 62, the insert includes two pieces 62a and 62b which meet at 63. The insert 62 forms a seal with the valve pin 31 at 72 to prevent core material from traveling up through the nozzle 17 to the actuator.

The skin material travels through bore 66 about an annular grove 68 about the periphery of insert 62. The annular grove facilitates the uniform flow of skin material as indicated by arrow 70 in FIG. 14. The insert 62 is constructed to form a seal with the valve pin 31 when the valve pin is in the middle or closed position which prevents core material from leaking out of the insert 62, and mixing with skin material. As seen in FIG. 14, when shutting off the core outlet in the middle position, the seal formed by the valve pin and the insert 62 also prevents the skin material from being injected into the bore 64 which contains the core material, and thus prevents skin and core material from being mixed together. The insert 62 can be made of tool steel, such as D2.

Sleeve 60 is seated on insert 62 at 74. Sleeve 60 and insert 62 are constructed such that there is a space 76 formed therebetween about which skin material flows. Sleeve 60 can be made of beryllium copper. Tip 58 is threadably mounted on nozzle 17 and acts to hold the sleeve 60 and insert 62 in place. The gate 33 is formed in the tip 58. The tip is machined to form a seal 78 with the mold, to prevent molded material from entering air space 29 about the nozzle 17. Tip 58 can be made of stainless steel420. An insulation space 80 is formed between the tip 58 and sleeve 60 to minimize heat loss from the nozzle to the mold. Seal 82 prevents molded material from entering this insulation space 80.

Figure 10:
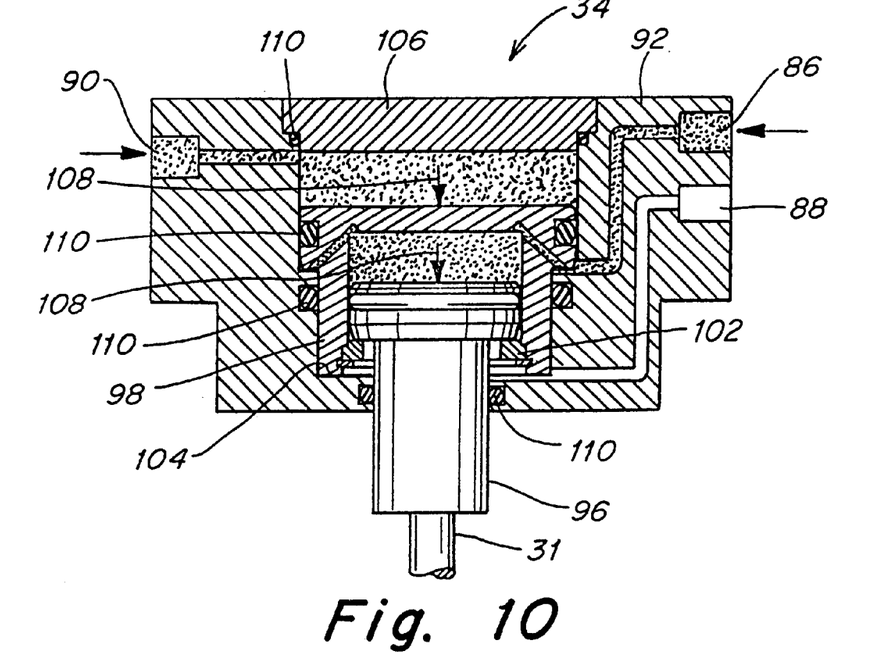
FIGS. 10, 11 and 12 are schematic cross sectional side views of the actuator of FIG. 9, shown in three respective positions.
Figure 11:
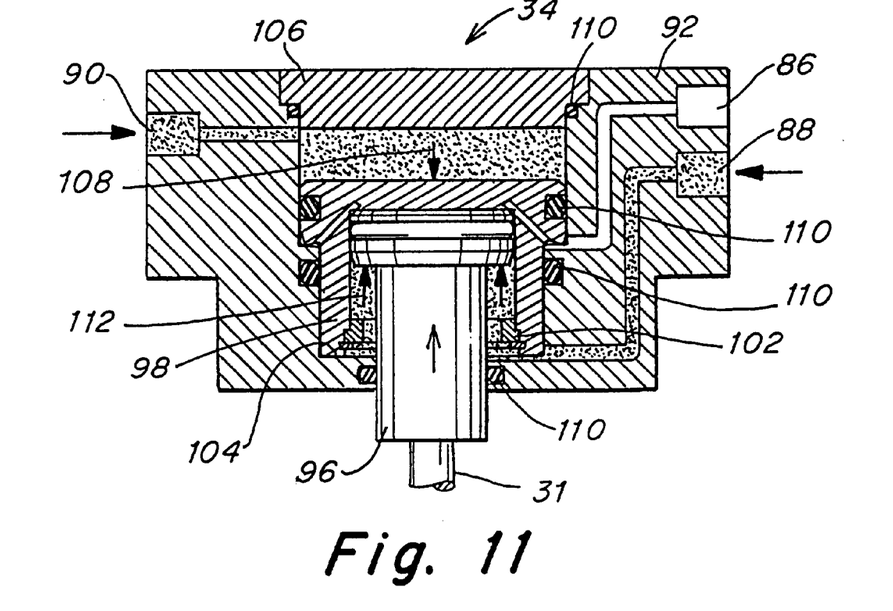
Figure 12:
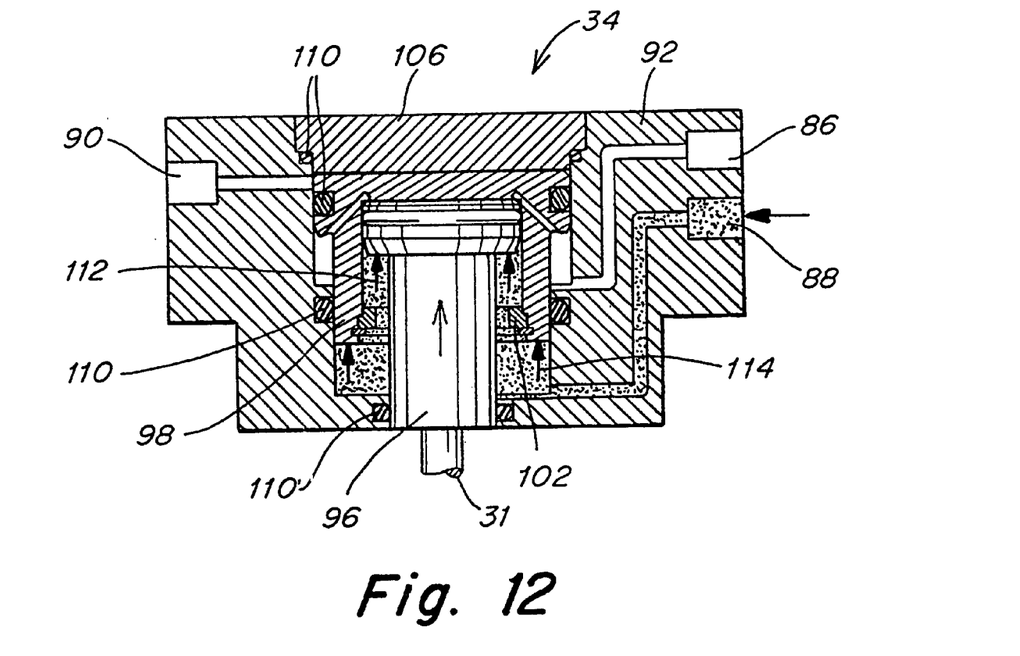

In order to move the valve pin 31 to its closed, middle and open positions, a three-position actuator 34 is provided. The actuator is described with reference to FIGS. 7–12. The actuator is mounted in top clamp plate 36 and includes hydraulic lines 86, 88 and 90. Alternatively, a pneumatic actuator can be used. The actuator includes an actuator cylinder 92 which is bolted to the top clamp plate 36 via screws 94. The actuator includes two movable pistons 96 and 98. Piston 96 is slidably movable within piston 98. The longitudinal movement of piston 96 causes longitudinal movement of valve pin 31 which is threadably mounted to piston 96 at 100. The longitudinal movement of the piston 96 is limited in one direction by the top of the piston 98 and in the opposite direction by ring 102 which is also mounted within piston 98. The movement of the piston 98 is limited in one direction by the actuator cylinder 92 at 104. The longitudinal displacement of the piston 98 is also limited in the opposite direction by actuator cap 106 which is threadably mounted to actuator cylinder 92. operation of the actuator will now be described with reference to FIGS. 10–12. Note, FIGS. 10–12 represent a schematic cross section to facilitate an understanding of the operation of the actuator 34, and specifically, the pressurization of the hydraulic lines 86, 88 and 90. When the valve position is in the closed position as illustrated in FIG. 13, the actuator piston 98 and actuator piston 96 are in the down position and hydraulic lines 86 and 90 are pressurized to exert downward pressure indicated by arrows 108 on each piston, as seen in FIG. 10. O-rings 110 provide a seal against leakage of hydraulic fluid. FIG. 11 shows the actuator position when the valve pin is in the position shown in FIG. 14, i.e., the middle position in which core flow is shut off and skin flow is permitted.

In FIG. 11, the hydraulic line 90 is still pressurized keeping piston 98 in the downward position but hydraulic line 86 is unpressurized. Line 88 is pressurized exerting a force on the piston 96 indicated by arrows 112. Thus, the piston 96 is displaced to the top of the piston 98. Once injection of skin material begins, pressure at 88 is no longer needed to maintain 88 biased against the top of piston 98, as injection pressure on the valve pin 31 biases the piston 96 toward piston 98.

When the valve pin is in the third or open position permitting core flow as shown in FIG. 15, the actuator is in the position shown in FIG. 12 in which hydraulic line 88 is pressurized but 86 and 90 are unpressurized causing piston 98 to be longitudinally displaced up to the actuator cap 106 by a pressure exerted on the bottom of the piston 98 as indicated by arrows 114.

Figure 11A:
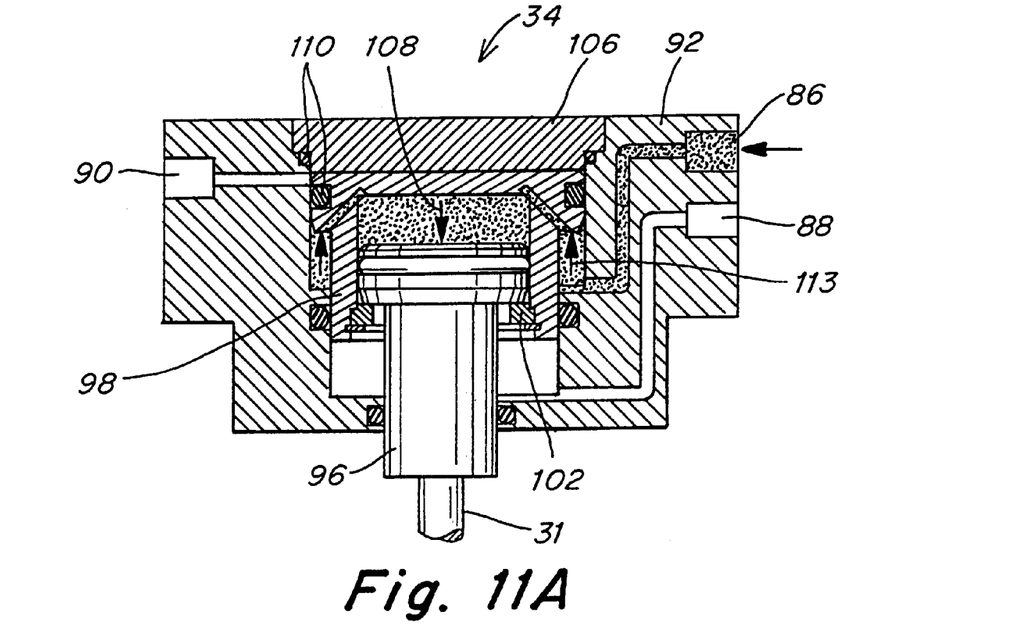
FIG. 11a shows an alternative piston positioning used to attain the same valve pin position shown in FIG. 11.

FIG. 11A shows an alternative embodiment of the actuator when the valve pin is in the middle position as shown in FIG. 14. As in FIG. 11, the valve pin is in the same position, and correspondingly, the piston 96 is in the same position. In FIG. 11A, this is accomplished by pressurizing line 86. Line 90 is depressurized. Referring to FIG. 10, when line 90 is depressurized, piston 98 is free to move into its uppermost position shown in FIG. 11A, bearing against the actuator cap 106. Movement of the piston 98 is caused by pressure exerted from the line 86 on the outer edge of the piston 98 indicated by arrows 113. The pressure from line 86 also maintains the piston 96 in its lowermost position with respect to piston 98 by virtue of the force 108 that bears on the top of the pistion 96, and piston 96 remains biased against ring 102 at the bottom of piston 98, as it was in FIG. 10. Thus, when piston 98 moves from its position shown in FIG. 10 to its position shown in FIG. 11A, it carries piston 96 with it.

As shown in FIGS. 1–4, an actuator 40 is provided to stop the flow of skin material through the manifold channel 15. An actuator is provided for each nozzle 17 to shut off the flow of skin material to that particular nozzle. The manifold shut-offs are used to control the flow of skin material through each nozzle, and can be used along with the valve pin core shut-off to sequentially fill the part. The manifold shut-offs enable core material to be injected out of one nozzle, and skin material to be injected out another nozzle, simultaneously, while pressure is maintained on both injection machine barrels (i.e., skin and core). The manifold shut-offs enable greater profitability with respect to nozzle sequencing and greater control of the location of weld lines. Simultaneous skin injection from one nozzle and core injection from a second nozzle is accomplished, for example, by shutting off skin material in the manifold associated with one nozzle, injecting core material out of that nozzle, and injecting skin material out a second nozzle by placing the valve pin of the second nozzle in the middle position shown in FIG. 14.

The actuators 40 used for the manifold shut-off are two-position hydraulic actuators. Pneumatic actuators can also be used. Another function of the skin shut-offs located in the manifold is to prevent possible back flow of skin material in the hot runner. During core injection, if a pressure differential exists between the gates, it is possible for core material to flow into the skin channel instead of the part. If core material enters the skin channel, it can cause contamination of the skin material with the core material. As a result, core material may appear on the part surface which will render the part unusable. The skin shut-off when used with the core shut-off can be used to completely control the skin-core-skin sequence in each nozzle independently while pressure is maintained on both machine barrels (i.e., skin and core). Alternatively, the manifolds can include like manifold shut-offs for the core material, to individually control the flow of core material to each nozzle.

Figure 17:
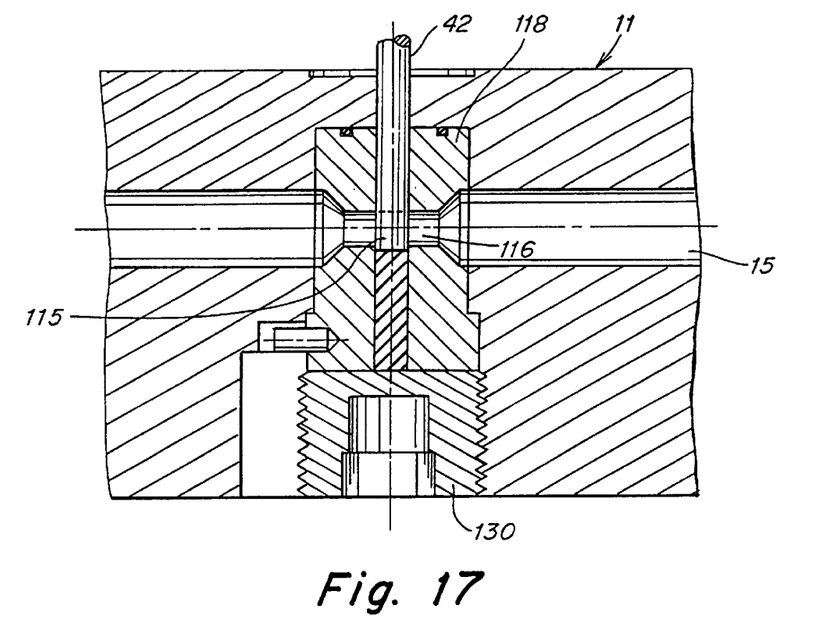
FIG. 17 is an enlarged fragmentary cross-sectional view of the manifold skin shut-off of FIGS. 2, 3, 4 and 6, shown in the closed position.

One embodiment of the manifold shut-off used with actuator 40 is shown in FIG. 17. The actuator 40, not shown in FIG. 17 (see FIGS. 2–4 and 6), is coupled to valve pin 42, and longitudinally displaces valve pin 42 to the open and closed positions, respectively. In FIG. 17, the valve pin is shown in the closed position. The end 114 of the valve pin blocks skin flow through passage 116 of plug 118. A set screw 130 holds the plug 118 in place.

Figure 18:
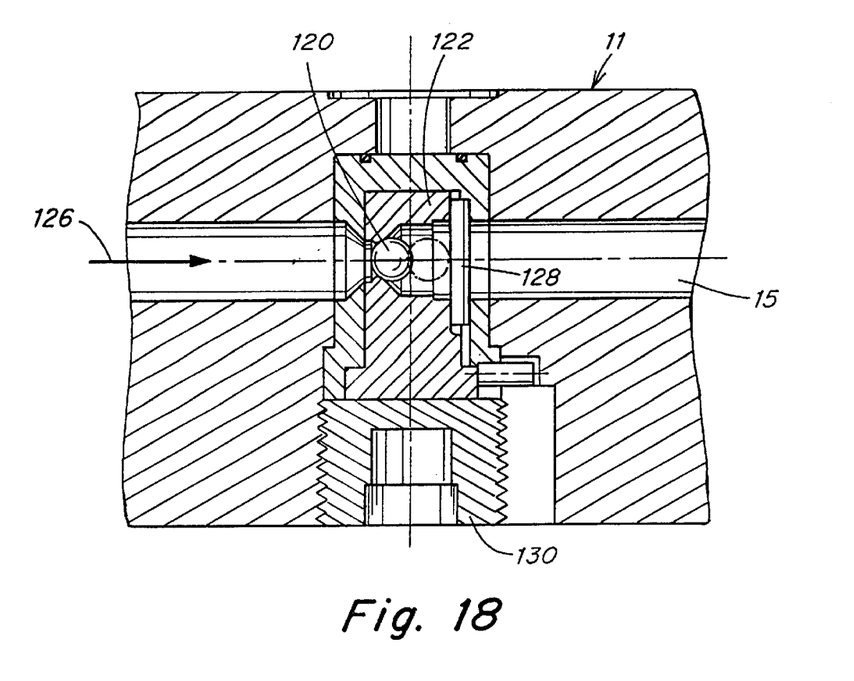
FIG. 18 is an alternative manifold configuration that uses a ball-check to prevent skin back flow through manifold channel 15.

FIG. 18 is an alternative embodiment of the present invention which is used to prevent the backflow of skin material through the manifold channel 15. In FIG. 18 a ball check 120 is provided which is shown in FIG. 18 in the closed position preventing the backflow of skin material through the channel 15. The ball check is mounted within a recess bore of housing 122. When skin material is flowing to the nozzle in the direction of arrow 126, the ball check moves to the position showed by the dash line to permit skin material flow thereabout. In the open position, the ball check is held within the housing 122 by a pin 128. A set screw 130 holds the assembly in place.

Figure 19:
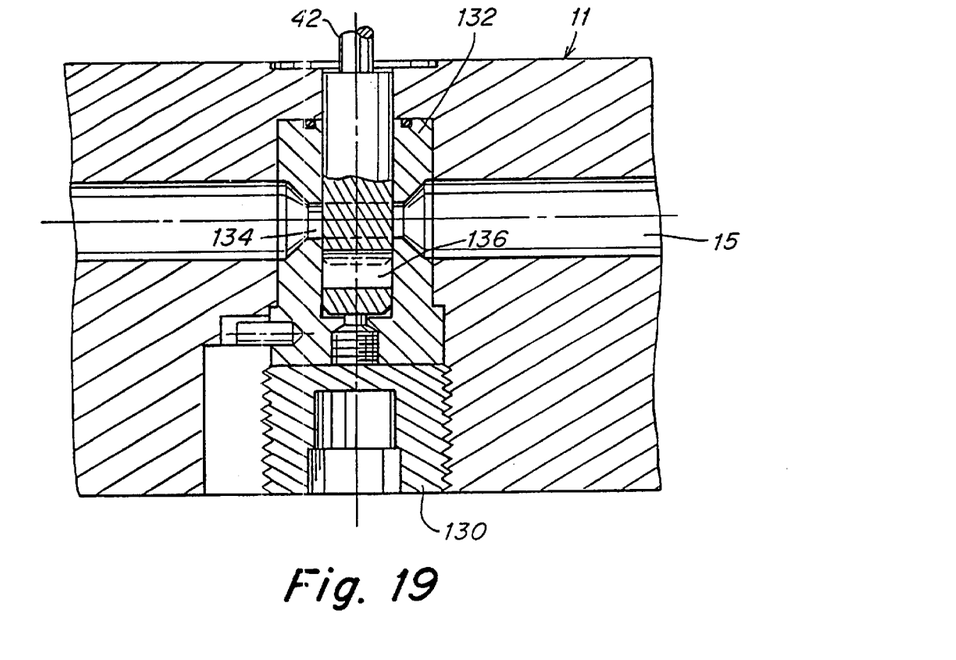
FIGS. 19 and 20 are alternative embodiments of the skin shut-off of FIG. 17, shown in the closed position.

An alternative embodiment of the manifold skin shut-off of FIG. 17 is shown in FIG. 19. FIG. 19 shows a valve pin 42 attached to a two-position actuator 40 (not shown). The shut-off is shown in the closed position in FIG. 19. A plug 132 having a channel 134 bored therethrough for permitting skin material flow has a central bore that receives valve pin 42. Valve pin 42 has an end in which a channel 136 is machined therethrough. When the valve pin is in the closed position as shown, a channel 136 does not mate with the bore 134 of the plug 132. However, when the valve pin is longitudinally displaced to its open position by the actuator 40, the channel 136 is aligned with the bore 134 to permit the flow of skin material.

Figure 20:
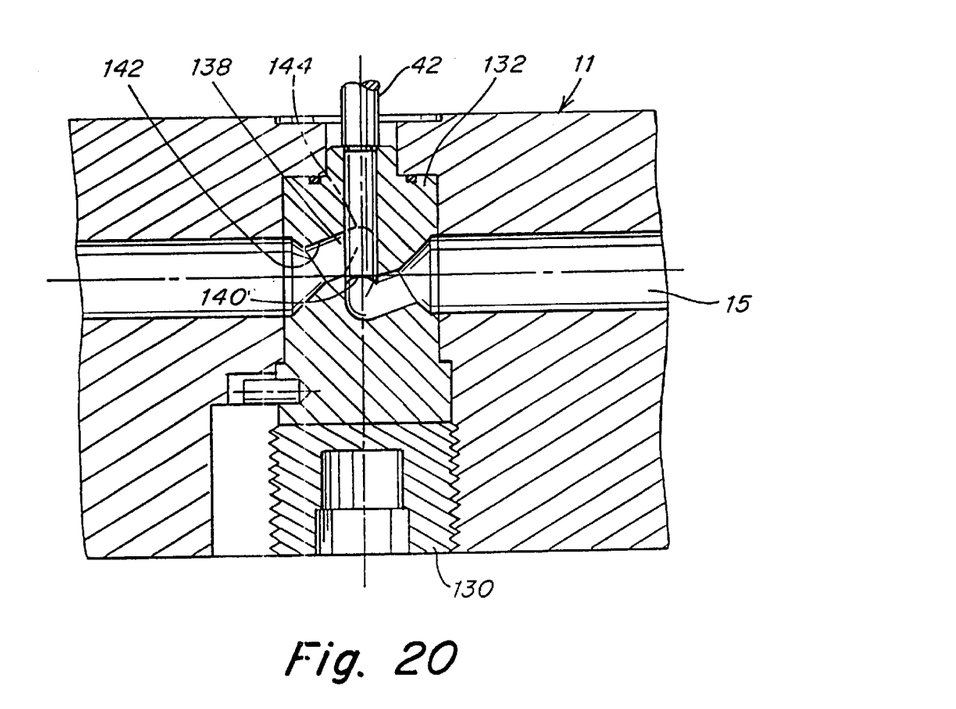

Another alternative embodiment of the manifold skin shut-off of FIG. 17 is shown in FIG. 20, which again shows the valve pin 42 attached to a two-position actuator 40 (not shown). In this embodiment plug 132 has an irregular shaped channel board therethrough 138. The end of valve pin 140, which is in the closed position, has a curved surface which, when valve pin 42 is longitudinally displaced to the open position, provides a smooth surface aligned with inner surface 142 of bore 138 as indicated by dashed line 144. An advantage of this configuration is that only a minimal side load is exerted on the valve pin 42 by the injected skin material, as compared to the embodiments of FIGS. 17 and 19.

Figure 16:
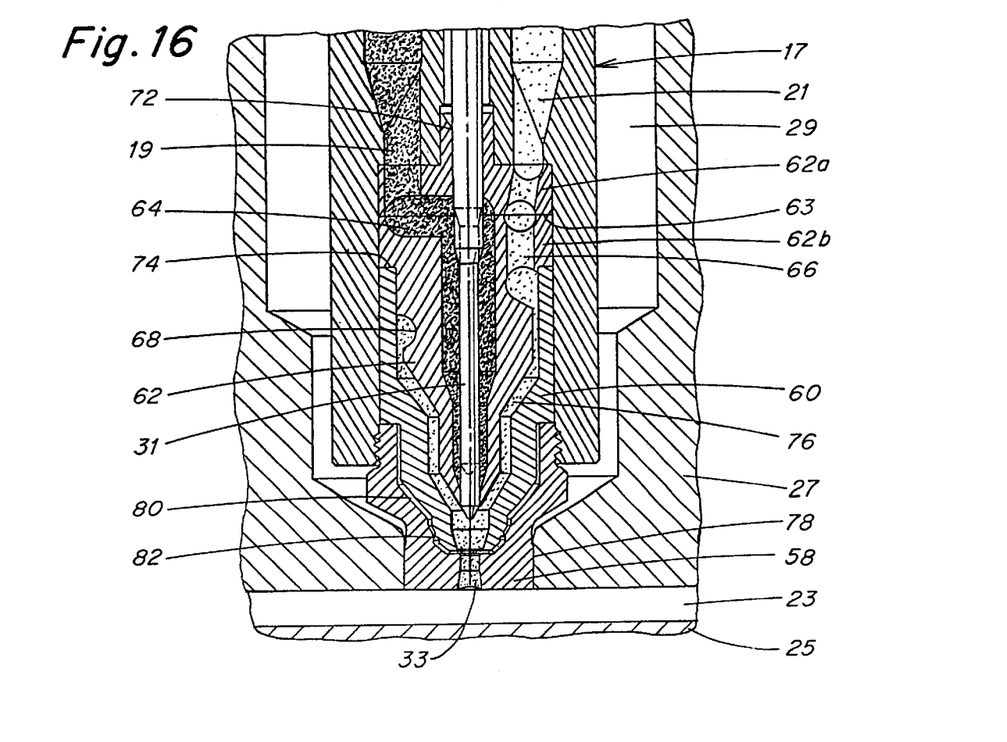
FIG. 16 is an alternative embodiment of a coinjection molding nozzle.

An alternative embodiment of the coinjection nozzle and actuator is shown in FIG. 16 in which only a two position actuator (not shown) is used to move the valve pin 31 in one of two positions. In one position the core channel 64 of the insert 62 is shut-off as shown in FIG. 16, and in the second or open position, the valve pin 31 is pulled back to open the bore 64 within insert 62 to permit the flow of core material. (The open position of the valve pin is shown in a dashed line). Thus, FIG. 16 shows a "thermal" gate version rather than a valve gate version of coinjection. In the thermal gate version, the coinjection cycle ends by having skin material freeze off in the gate 33, rather than by having a valve pin close the gate. The thermal gate avoids the need for a three position actuator, while the valve gate version offers a wider processing window with less chance of stringing or drooling at the gate.

Having thus described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereof.

What is claimed is:

1. An injection molding apparatus for use in coinjection comprising:
   a valve pin actuator that supports a valve pin adapted to control skin material flow and core material flow into a mold cavity; and
   an injection molding nozzle to inject skin and core material into the mold cavity, wherein the valve pin reciprocates through the injection molding nozzle, the injection molding nozzle including:
   a nozzle body;
   an insert coupled to an end of the nozzle body, said insert including a bore in communication with a first bore of the nozzle body through which said core material is adapted to flow, and an annular spiral indentation formed on a surface of the insert about which the skin material is adapted to flow, said skin material to be fed into said spiral indentation from a second bore of the nozzle body through which said skin material is adapted to flow.

2. The injection molding apparatus of claim 1, wherein the bore of the insert is a first bore of the insert, and the insert further includes a second bore in communication with the second bore of the nozzle body.

3. The injection molding apparatus of claim 2, wherein the valve pin reciprocates through a third bore of the nozzle body and a third bore of the insert in communication with the third bore of the nozzle body.

4. The injection molding apparatus of claim 3, wherein the valve pin also reciprocates through the first bore of the insert.

5. The injection molding apparatus of claim 4, wherein the third bore of the insert is in communication with the first bore of the insert.

6. The injection molding apparatus of claim 5, wherein the second bore of the insert is adapted to feed skin material into said annular spiral groove.

7. The injection molding apparatus of claim 2, wherein the second bore of the insert feeds skin material into said annular spiral groove.

8. The injection molding apparatus of claim 1, further comprising a tip coupled to said nozzle body, said tip acting to hold said insert in place.

9. The injection molding apparatus of claim 8, wherein the tip is threadably mounted to said nozzle body.

10. The injection molding apparatus of claim 6, further comprising a tip coupled to said nozzle body, said tip acting to hold said insert in place.

11. The injection molding apparatus of claim 10, wherein the tip is threadably mounted to said nozzle body.

\* \* \* \* \*